United States Patent [19]

Muraki et al.

[11] 4,044,102

[45] Aug. 23, 1977

[54] METHOD FOR TREATING EXHAUST GASES

[75] Inventors: Ryoji Muraki; Masao Endo, both of Nishinomiya; Nobuaki Aoki, Hirakata; Masahiro Takeshita, Nishinomiya, all of Japan

[73] Assignee: Kurashiki Boseki Kabushiki Kaisha, Japan

[21] Appl. No.: 642,625

[22] Filed: Dec. 19, 1975

[30] Foreign Application Priority Data

Dec. 28, 1974 Japan .................................. 50-3228

[51] Int. Cl.$^2$ ............................................ B01D 53/34
[52] U.S. Cl. .................... 423/239; 23/288 F; 55/59; 252/411 R; 423/244; 55/474
[58] Field of Search ........... 23/288 F, 288 FB, 288 B, 23/288 G, 288 E; 60/299, 295; 423/213.2, 213.7, 235, 239, 244; 252/411 R, 416, 418; 55/59, 474

[56] References Cited

U.S. PATENT DOCUMENTS

| 1,936,154 | 11/1933 | Carter | 252/411 |
|---|---|---|---|
| 1,995,293 | 3/1935 | Clark | 252/411 |
| 2,493,218 | 1/1950 | Bergstrom | 23/288 G |
| 2,777,759 | 1/1957 | Sokolik | 23/288 FB UX |
| 3,250,696 | 5/1966 | Schutte | 23/284 X |
| 3,497,328 | 2/1970 | Calvert | 23/288 B UX |
| 3,581,490 | 6/1971 | Morris | 60/295 |
| 3,770,388 | 11/1973 | Zenz | 55/474 |
| 3,816,595 | 6/1974 | Lahaye et al. | 423/239 |
| 3,908,367 | 9/1975 | Bauman | 60/295 |
| 3,915,890 | 10/1975 | Soldate | 252/411 |
| 3,930,805 | 1/1976 | Vogt et al. | 23/288 F |

OTHER PUBLICATIONS

Closing in on an Emissions Catalyst-Metals Week; Feb. 1971.

$NO_x$ Reduction Catalysts for Vehicle Emission Control; Meguerian et al., SAE paper 710, 291, (offered as a new publication in Automotive Engineering, Apr. 1971).

Primary Examiner—G. O. Peters
Attorney, Agent, or Firm—Jones, Tullar & Cooper

[57] ABSTRACT

Apparatus for treating exhaust gases comprising a catalyst bed through which the exhaust gas is passed whereby nitrogen oxides and dust present therein are removed from the gas, said catalyst bed being designed such that the catalyst therein is discharged from the bed continuously or intermittently while being fed in an amount that can compensate for the discharged amount, a heating device for heating the catalyst discharged from the bed to a temperature in a range from about 700° to 1200° C. for reactivation of the catalyst and separation of the dust accumulated on the bed surface and retained in the interstices between the catalyst particles therein, and a device for discharging sulfur dioxides produced during the course of heating the catalyst. This apparatus is very effective in simultaneously removing the nitrogen oxides and the dust from exhaust gases such as boiler exhaust gases.

6 Claims, 4 Drawing Figures

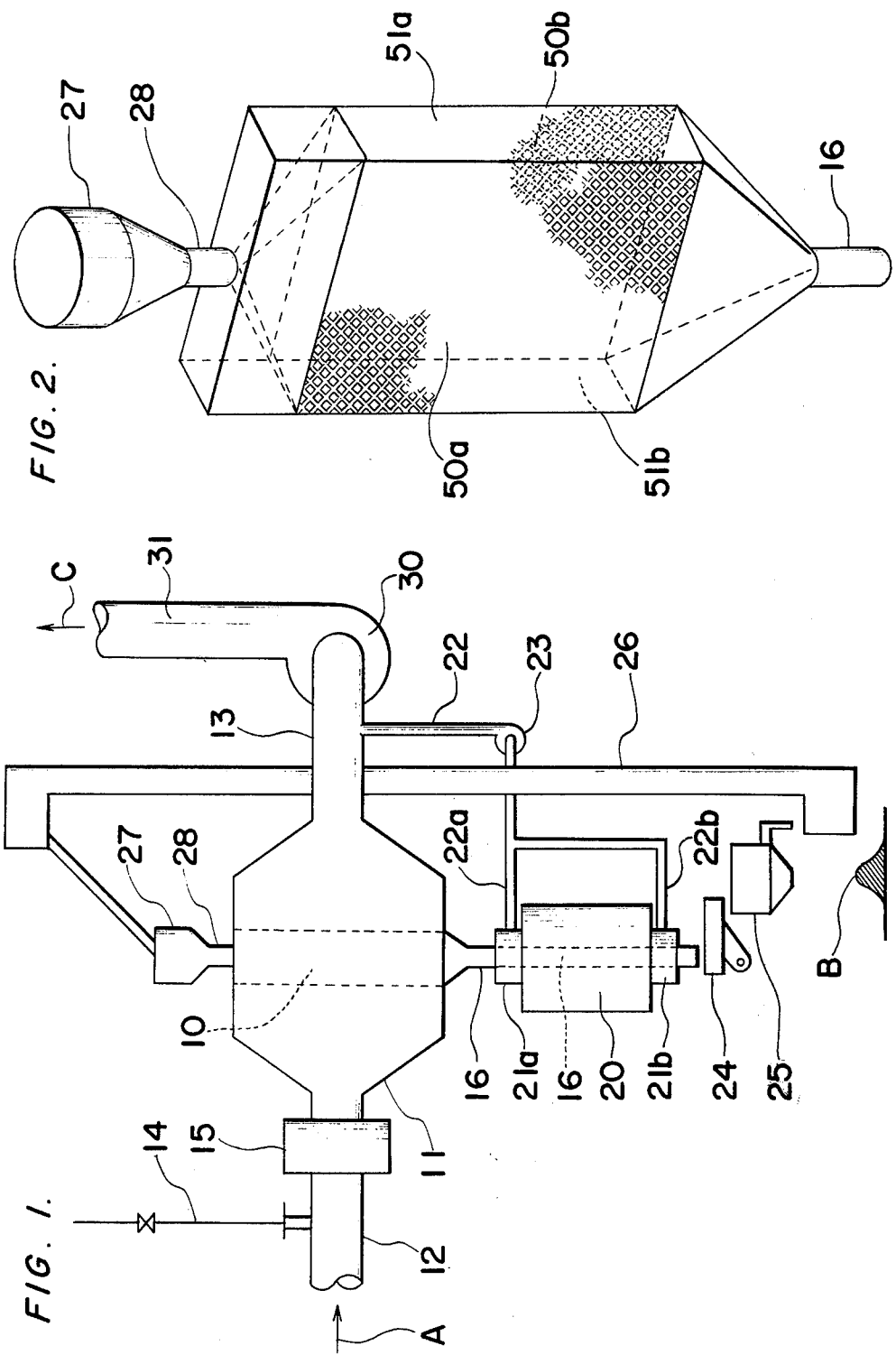

METHOD FOR TREATING EXHAUST GASES

The present invention relates to an apparatus for treating exhaust gases and, more particularly, to an exhaust gas treating apparatus suitable for use in eliminating nitrogen oxides and simultaneously removing dust from the exhaust gas.

Generally, catalyst fixed-bed reactors commonly used for denitrogenation would be applicable to the removal of the nitrogen oxides without difficulty, if industrial waste gases containing nitrogen oxides are free from dust and sulfur oxides. Such exhaust gases, however, contain commonly a large amount of impurities including dust and sulfur dioxides, and this is particularly true in exhaust gases from boiler facilities using heavy oil. Where commonly used catalyst fixed-bed reactors are employed in eliminating nitrogen oxides from such so-called "dirty" gases, dust contained therein should be removed prior to denitrogenation; otherwise, such dust becomes accumulated on the surface of the catalyst bed and in the interstices between the catalyst particles. This may impair the effects of the catalyst for removal of nitrogen oxides, and the accumulation of dust may cause the plugging of the fixed beds, whereby the continuous operation of the nitrogen oxides removal is rendered ineffective or infeasible. Exhaust gases produced by the combustion of fuels such as heavy oil, e.g., boilder exhaust gas, usually also contain a large amount of dust or very fine particles having a size of less than about one micron; accordingly, a high performance dust collector such as an electric dust collector has been usually employed for the elimination of such dust. The operation of collecting dust from flue gas has been usually carried out at relatively low temperatures, while commonly used reactors for removing nitrogen oxides therefrom according to the dry catalytic reduction method are operated at considerably higher temperatures. Accordingly, the flue gases that once was cooled for the dust collection should be heated again for the removal of nitrogen oxides. This is extremely inconvenient and disadvantageous from an economic standpoint.

Catalysts which have been generally used for conventional fixed-bed reactors are periodically treated to remove dust accumulated on the surfaces of the catalyst bed and retained in the interstices between the catalyst particles. Where catalysts are used for a gas containing sulfur oxides as well as dust, the dust that are accumulated or retained in the catalyst bed may render the catalyst so viscous and sticky that it is very difficult and laborious to remove by means of a mechanical device. The rinsing of such catalysts with water is only practically available; however, this presents the disadvantages that some portion of the effective components may become dissolved out into the rinsing water and, as a result, their activity may decrease and in some cases they are damaged. The rinsing water that contains the dissolved components of catalyst, when discharged directly without prior waste disposal treatment, may cause a problem with pollution and contamination of environment.

It is therefore the primary object of the present invention to provide an apparatus for treating exhaust gas wherein removal of dust and nitrogen oxides is effected more advantageously than observed with methods of similar purpose heretofore available.

It is another object of the present invention to provide an apparatus for treating exhaust gas wherein removal of dust and nitrogen oxides is simultaneously effected continuously.

An additional object of the present invention is to provide an apparatus for treating exhaust gas in which nitrogen oxides are eliminated without heating the exhaust gas prior to the removal thereof.

Other objects, features and advantages of the present invention will become apparent in the following description of the specification and from the accompanying drawings and the appended claims.

The apparatus of the present invention comprises a catalyst bed which is disposed in a casing and designed so as to allow the catalyst therein to be fed and discharged continuously or intermittantly while the gas is passed through the catalyst bed, means for heating the catalyst leaving the catalyst bed at a temperature in a range of about 700° to 1,200° C., said means being connected at its inlet side to the outlet of the catalyst bed, means for discharging a gas produced by heating the catalyst with said heating means, and means for transporting the catalyst which was treated for reactivation and separated from the dust back again to the catalyst bed.

In order to make the present invention more apparent, reference is made to the accompanying drawings representing diagrammatically and by way of example a form of apparatus for treating exhaust gas.

FIG. 1 is a schematic representation of the apparatus of the present invention;

FIG. 2 is a perspective view of the catalyst bed covering to be used in the apparatus of the present invention;

Figure 3:
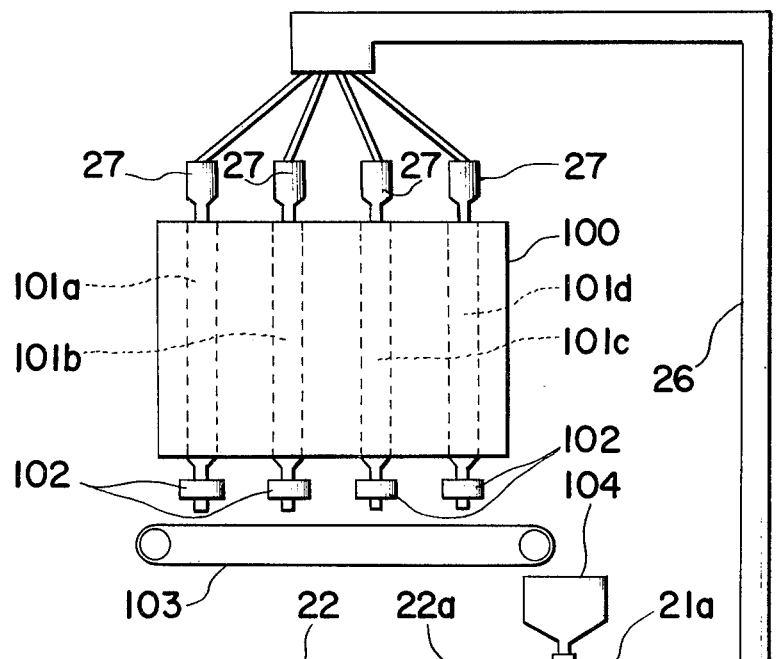
Figure 4:
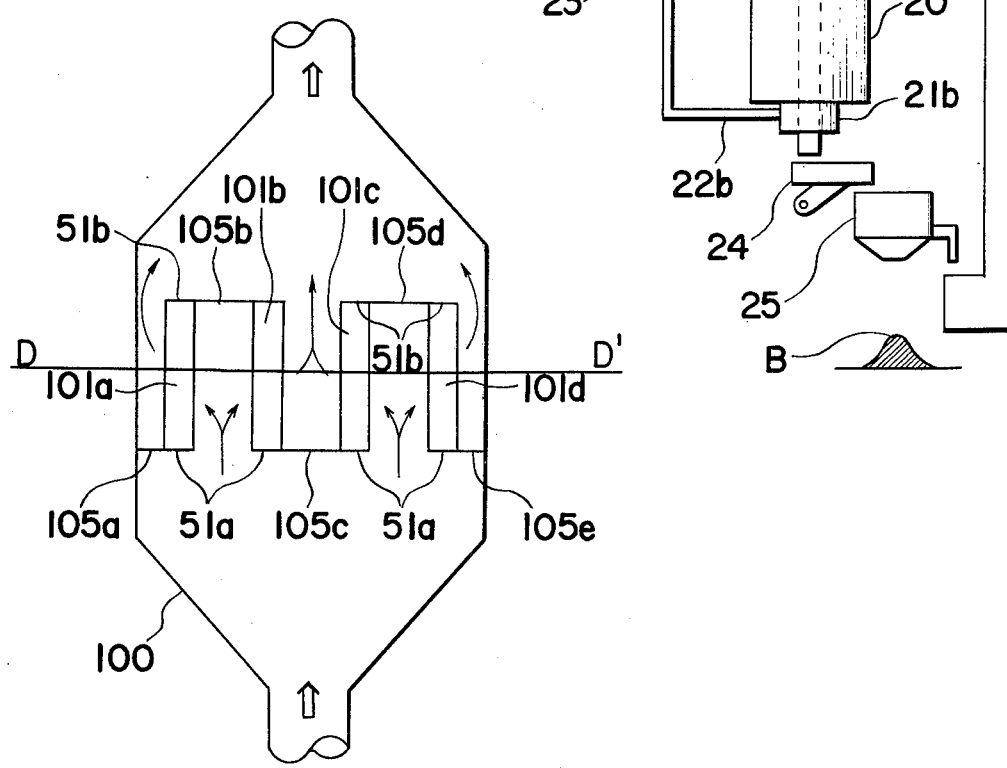

FIG. 3 is a schematic representation of the apparatus according to the present invention, in which a plurality of catalyst beds are disposed in a casing the casing shown in the cross-section on the plane designated by the line D–D' in FIG. 4; and FIG. 4 is a schematic, representation of a top view of the casing of FIG. 3 (with means 26 and 27 not shown) which shows the arrangement of the catalyst beads in relation to the exhaust gas flow through the casing.

Referring first to FIG. 1, there is schematically seen a catalyst bed covering 10 that can be of a column shape or of any other shape suitable for use for this purpose. The catalyst bed is disposed in a casing 11 which is connected at its inlet side to a supply duct 12 and at its outlet side to a duct 12 leading to a means for removing sulfur oxides. An exhaust gas containing nitrogen oxides such as nitrogen monoxide and dioxide as well as dust is previously adjusted to a temperature, for example, of about 400° to 430° C., thereby making it suitable for the subsequent treatment by means of the apparatus of the present invention. The gas is then mixed with a reducing agent such as ammonia gas which is fed from a pipe 14 connected to the supply duct 12. The gaseous mixture may be admixed well with a means 15 for admixing gas, the means being disposed at the exit side of the supply duct. The gas mixture is then led in a direction as indicated by the arrow A to the casing 11 and the nitrogen oxides are removed from the gas mixture by reduction into nitrogen and water during the course of the passage thereof through the catalyst bed 10. At the same time, the dust contained in the gas is removed as it is retained in the interstices between the catalyst particles and accumulated in the catalyst bed. The catalyst bed is designed such that the catalyst is allowed to be discharged continuously or intermittantly therefrom while being fed continuously or intermittently thereinto to compensate for the amount of the discharged catalyst. The catalyst discharged from the catalyst bed is carried over continuously or intermittantly to a tubular body 16 connected at its inlet end to the catalyst bed 5 and leading to a means 20 for heating the catalyst for reactivation and removal of the dust retained and accumulated therein.

The means 20 for heating the catalyst discharged from the catalyst bed may comprise any conventional heating device. By this means, the catalyst is heated to a temperature in a range from about 700° to 1,200° C., preferably up to about 1,000° C. The heating device 20 is designed so as to cover around the tubular body through which the catalyst discharged from the bed is transferred continuously or intermittantly. The heating device is equipped at its top and bottom portions with outer coverings 21a and 21b, respectively, which are each provided with openings (not shown) connected to discharge pipes 22a, 22b for discharging a gas from the heating device. The tubular body 16 is provided at its portion encircled with the heating device with openings (not shown) for allowing removal or discharge of the gas produced by the heating of the catalyst. Such a gas that is composed mainly of sulfur oxides is removed through the openings from the tubular body and led to the sulfur oxides removal apparatus through the pipes 22a, 22b which are combined with each other and then connected to the vent duct 13 through a vent fan 23. The catalyst that was heated to the temperature in the said range is reactivated and recovers its catalytic activity to a level substantially as much as its original activity. The dust retained and accumulated in the catalyst bed is also separated from the catalyst particles as the catalyst is heated and moved.

The reactivated catalyst that still contains together with the thermally degraded materials is discharged continuously or intermittantly from the tubular body through a discharging device 24 to a separator 25. The separator can separate the catalyst from the degraded materials and furnish a conveyor 26 with the catalyst, the conveyor being capable of carrying over the catalyst to a feeding device 27 for feeding the catalyst into the catalyst bed 10. By means of the feeding device, the catalyst is fed continuously or intermittantly through a feed inlet 28 to the catalyst bed.

In FIG. 1, the letter B indicates the degraded materials separated from the catalyst by means of the separator. The arrow indicated by C is a direction in which the gas from which the nitrogen oxides and dust are eliminated is led to an apparatus for removing sulfur oxides. The gas passing through the vent duct 13 is supplied by means of a vent fan 30 through a duct 31 to the sulfur oxides removal apparatus.

Referring specifically to FIG. 2, there is seen a catalyst bed covering 10 which is composed of a front wall 50a, a rear wall 50b, a first side wall 51a and a second side wall 51b. The front and rear walls are made of a perforated plate member through which the gas to be treated is passed. The front wall referred to herein is the wall of the catalyst bed covering at the side of the inlet of the gas into the catalyst bed and the rear wall is the wall at the side of the outlet thereof. The side walls are made of a plate member having no holes through which the gas passes. The first side wall referred to hereinafter is the wall at the side of the inlet of the casing 10 and the second side wall is the wall facing the outlet of the casing.

FIG. 3 shows a construction of the apparatus of the present invention, in which a casing 100 is disposed with a plurality of catalyst beds, designated generally 101, having the same structure as seen in FIG. 2. The number of the catalyst beds may vary depending mainly upon the size of the apparatus of the present invention and the amount of gas feed, although there is as a rule no limitation on the number of the beds. In a case where a plurality of the catalyst beds are disposed, it is advisable to provide each of the catalyst beds with the feeding device 27 and a discharging device indicated generally by the number 102. Furthermore, it is convenient to design the apparatus to allow the continuous or intermittant discharge of the catalyst from the beds through the discharging device 103 onto a horizontal endless belt conveyor 103 which is in turn arranged so as to be capable of carrying over the catalyst to a feeding device 104 for feeding it to the tubular body referred to as 16 as has been shown in FIG. 1. The catalyst is then handled and treated in substantially the the same manner as with the apparatus of FIG. 1, so that the reference numbers identical thereto are employed in the same manner as in FIG. 1.

Referring specifically to FIG. 4, there is seen a casing 100 in which four of catalyst beds 101a, 101b, 101c, 101d are disposed. In this apparatus, the catalyst beds are arranged in a manner that they are disposed in side-by-side relationship in which their front walls face each other and that their front and rear walls are arranged in parallel to the direction in which the exhaust gas is fed into the casing. The catalyst beds are also arranged in such a manner that the exhaust gas is allowed to pass the catalyst bed only through the front walls of the covering as indicated by the arrows. For this purpose, spacings between the side wall and the catalyst bed and between the catalyst beds facing each other are blocked with a plate member, designated generally 105, such as baffles, to prevent the gas to pass in order to lead the gas to the front wall of the catalyst beds for the passage therethrough. Specifically, a spacing between the side wall of the casing 100 and the catalyst bed 101a is blocked with a plate member 105a at the side of the first side wall 51a of the catalyst bed covering. Similarly, a spacing between the catalyst beds 101a and 102b is also blocked with such a plate member 105b disposed between the second side wall 51b of the bed 101a and the second side wall 51b of the bed 101b. Furthermore, the plate member 105c is disposed between the first side walls 51a of the catalyst beds 101b and 101c. Spacings between the catalyst beds 101c and 101d and between the catalyst bed 101d and the side wall of the casing 100 are provided with the plate members 105d and 105e, respectively, in a manner similar to those as disclosed hereinabove. The provision of the plate members in such a manner as described above can allow the exhaust gas to pass only the front walls of the catalyst beds. It is to be noted, however, that the mode or arrangement of the catalyst beds is not construed as being limited to the above feature and that any possible arrangement should be construed as being included within the spirit and the scope of the present invention.

The catalyst to be used for the apparatus of the present invention may be any catalyst which is capable of reducing the nitrogen oxides present in exhaust gases, particularly in combustion furnace gas in the presence of ammonia. The catalysts may be oxides of metals such as copper, iron, cobalt, chromium, nickel, manganese, titanium, vanadium, molybdenun, silver, platinum, rhodium or palladium or a mixture thereof. They may be supported on any conventional carrier or material equivalent thereto, such as a variety of oxides including mono-, di- or poly-component system, particularly any carrier consisting essentially of alumina or containing alumina. Examples of such carriers are, for example, alumina, silicon-alumina, magnesia-alumina, titania-alumina, calcium oxide-alumina, chromium oxide-alumina or silica-chromium oxide-alumina. These catalysts may be prepared in conventional manner: for example, by the precipitation method using a precipitating agent such as sodium carbonate, sodium hydroxide, ammonium hydroxide, ammonium sulfide or sodium sulfide; by the support-immersion method; by the thermal decomposition method; and by the admixture method; and a mixture thereof. An example of the process for preparing a catalyst is immersing a gamma-alumina carrier having an average particle size of 4 mm. in a 20 weight percent copper sulfate for 24 hours, washing the resulting carrier with water, drying and calcining it for 2 hours at 470° C.

The following are examples in which the apparatus of the present invention is employed. The catalyst bed was packed with said catalyst in an amount that can give a catalyst layer with a width of 200 mm. and an effective height of 2,500 mm. The catalyst layer was arranged to move downward at a rate of 25 mm. per hour. That is, it was designed to be completely renewed in 100 hours.

Boiler exhaust gases produced by burning heavy oil having a 2.8 percent sulfur content were used in the following experiments to demonstrate the effects of the apparatus of the present invention. They are found to have the following compositions (in percent by volume unless otherwise specified)

| Composition | Gas Samplings | | | |
|---|---|---|---|---|
|  | A | B | C | D |
| $N_2$ | 74.5 | 74.0 | 73.5 | 74.6 |
| $CO_2$ | 14.6 | 13.9 | 14.6 | 14.0 |
| $O_2$ | 1.5 | 2.4 | 1.8 | 2.3 |
| $H_2O$ | 9.4 | 9.7 | 10.1 | 9.1 |
| $SO_x$(p.p.m.) | 1600 | 1460 | 1520 | 1250 |
| $NO_x$(p.p.m.) | 330 | 260 | 290 | 240 |
| Dust (grams/Nm³) | 0.12 | 0.08 | 0.10 | 0.07 |

With the apparatus of the present invention, these gases were introduced at a temperature of 425° C. and a space velocity of 7,000 liter-gas per liter-catalyst per hour. Table 1 shows the results with respect to removal of nitrogen oxides including nitrogen oxide and dioxide and of dust.

TABLE 1

| Composition | Gas Samplings | | | |
|---|---|---|---|---|
|  | A | B | C | D |
| $NO_x$ (p.p.m.) | 20 | 16 | 17 | 14 |
| Dust (grams/Nm³) | 0.015 | 0.012 | 0.014 | 0.010 |

The table shows that the nitrogen oxides and dust were removed from the boiler exhaust gases on the order of 90 percent and 80 percent, respectively.

It is noted that the results obtained did not decrease to a significant extent with the temperature.

Table 2 below shows the loss of the gas passage pressure when one of said gas was fed, in three cases. First, the catalyst layer was moved downward at a linear velocity of 25 mm. per hour. Secondly, the catalyst layer went downward at a linear velocity of 50 mm. per hour. Thirdly, the catalyst layer was maintained without the downward movement. The loss of the gas passage pressure was measured in 1, 10, 20, 50, and 200 hours after the gas started being fed. The results are expressed in mm.Aq.

TABLE 2

| Movement of Catalyst Bed | Elapse of Treating Period of Time (hour) | | | | |
|---|---|---|---|---|---|
|  | 1 | 10 | 20 | 50 | 200 |
| Linear velocity (25 mm./hour) | 54 | 55 | 54 | 56 | 55 |
| Linear velocity (50 mm./hour) | 53 | 52 | 55 | 53 | 54 |
| No movement | 53 | 72 | 94 | 218 | — |

This table indicates that the loss of the gas passage pressure, when the catalyst bed is maintained without the downward movement, increases to a considerable extent by about two times in 20 hours and by about four times in 50 hours. This implies that the apparatus of the present invention is extremely superior in collecting dust present in exhaust gases.

It is to be noted that there is correlation between the rate of the catalyst movement in the catalyst bed, the dust concentration, and the velocity of the gas passage. It is said that the rate of the dust removal increases with the unit surface area (height and width) of the catalyst bed and may be restricted by the dust concentration. This is compensated for by a linear velocity at which the catalyst is moved in the catalyst bed.

From the results of Table 2, it is preferred that the catalyst is moved downward at a linear velocity of about 25 mm. per hour or more. It will be possible to apply a linear velocity of the catalyst movement in a much wider range, for example, from about 10 to 100 mm. per hour and preferably from about 25 to 50 mm. per hour. The effective height of the catalyst in the catalyst bed may vary over a wide range and may be from about 500 to 10,000 mm. and preferably from about 2,500 to 5,000 mm. The width of the catalyst in the catalyst bed may also vary over a wide range and may be in a range from about 100 to 500 mm. and preferably from about 200 to 400 mm.

It is noted that the catalyst bed may be designed so as to make the catalyst renew completely in several hundreds hours even if the dust concentration is relatively low since the catalyst is inactivated with the elapse of a treating period of time. The rate of the catalyst circulation should be raised where a dust concentration is fairly high. The apparatus of the present invention makes such an adjustment easy.

What we claim is:

1. In a continuous method of removing nitrogen oxides and dust from flue gases formed by the combustion of fuel which comprises passing the flue gas, in admixture with ammonia, through a fixed particulate catalyst bed capable of reducing nitrogen oxides in the presence of ammonia, wherein said nitrogen oxides are reduced and said dust is retained by the catalyst bed thereby increasing the gas passage pressure, the improvement which comprises:

a. continuously or intermittently discharging a portion of the particulate catalyst and accumulated dust from said bed at a rate between about 10 to 100 mm per hour per 500 to 10,000 mm of catalyst bed height, which rate is sufficient to prevent plugging of the catalyst bed, while feeding catalyst into the catalyst bed in an amount that compensates for the amount of catalyst removed, b. heating of the catalyst discharged from said bed to reactivate said catalyst and remove a gas therefrom, c. separating the reactivated catalyst from the dust, and d. returning the regenerated catalyst to the catalyst bed.

2. A method, as in claim 1, wherein the catalyst discharged from the catalyst bed is heated in the range of about 700° to 1200° C.

3. A method, as in claim 2, wherein the catalyst is heated in the range of 700° to 1000° C.

4. A method, as in claim 1, wherein the flue gas further comprises sulfur oxides.

5. In a continuous method of removing nitrogen oxides and dust from flue gases formed by the combustion of fuel which comprises passing the flue gas, in admixture with ammonia, through a fixed particulate catalyst bed capable of reducing nitrogen oxides in the presence of ammonia, wherein said nitrogen oxides are reduced and said dust is retained by the catalyst bed thereby increasing the gas passage pressure, the improvement which comprises:

a. continuously or intermittently discharging a portion of the particulate catalyst and accumulated dust from said bed at a rate between about 10 to 100 mm per hour per 500 to 10,000 mm of catalyst bed height, which rate is sufficient to prevent plugging of the catalyst bed, while feeding catalyst into the catalyst bed in an amount that compensates for the amount of catalyst removed, b. separating the catalyst from the dust, and c. returning the catalyst to the catalyst bed.

6. A method, as in claim 5, wherein the flue gas further comprises sulfur oxides.

* * * * *